US010426093B2

(12) United States Patent
Isaac et al.

(10) Patent No.: US 10,426,093 B2
(45) Date of Patent: Oct. 1, 2019

(54) CONICAL ROTOR DISCHARGE HOUSING WITH ADJUSTABLE VANES (71) Applicant: CNH Industrial America LLC, New Holland, PA (US)

(72) Inventors: Nathan E. Isaac, Lancaster, PA (US); Wayne Thomas Flickinger, Oxford, PA (US); Austin Jackson, Jackson, SC (US)

(73) Assignee: CNH Industrial America LLC, New Holland, PA (US)

( * ) Notice: Subject to any disclaimer, the term of this patent is extended or adjusted under 35 U.S.C. 154(b) by 14 days.

(21) Appl. No.: 15/435,539

(22) Filed: Feb. 17, 2017

(65) Prior Publication Data
US 2018/0235151 A1 Aug. 23, 2018

(51) Int. Cl.
A01F 7/06 (2006.01)
A01F 12/18 (2006.01)
A01F 12/40 (2006.01)

(52) U.S. Cl.
CPC .............. A01F 7/067 (2013.01); A01F 12/18 (2013.01); A01F 12/40 (2013.01)

(58) Field of Classification Search
CPC .. A01F 7/067; A01F 7/06; A01F 7/062; A01F 12/18; A01F 12/40; A01F 12/181; A01F 12/24; A01F 12/26; A01D 34/42; A01D 41/1243
See application file for complete search history.

(56) References Cited

U.S. PATENT DOCUMENTS

| 5,885,155 A * | 3/1999 | Dwyer ................ A01F 12/18 460/109 |
| 6,152,820 A * | 11/2000 | Heidjann ............ A01F 12/40 460/112 |
| 6,241,605 B1 * | 6/2001 | Pfeiffer ................ A01F 7/06 460/112 |
| 6,468,152 B2 * | 10/2002 | Moriarty ............... A01F 7/06 460/67 |
| 7,473,169 B2 * | 1/2009 | Isaac .................. A01F 7/067 460/80 |
| 7,485,035 B1 * | 2/2009 | Yde ................ A01D 41/1243 460/111 |
| 7,731,576 B2 * | 6/2010 | Isaac .................. A01F 7/067 460/84 |

(Continued)

Primary Examiner — Alicia Torres
Assistant Examiner — Adam J Behrens
(74) Attorney, Agent, or Firm — Peter K. Zacharias; Patrick M. Sheldrake (57) ABSTRACT A threshing system for an agricultural harvester includes a rotor having a proximal end adapted to receive material from a feeding mechanism and a distal end. A discharge housing surrounds the distal end of the rotor. The discharge housing includes a side wall spaced radially apart from the rotor to define a discharge passage between the rotor and the discharge housing. At least one vane is pivotably mounted to the side wall of the discharge housing at a downward swept side of the rotor. The vane extends from the inner surface of the discharge housing. The position of the vane is adjustable to change a trajectory of material expelled from the discharge passage. The vane is positioned on a large diameter portion of the discharge housing in order to limit compression of the material as the material passes along the at least one vane.

21 Claims, 11 Drawing Sheets (56) References Cited

U.S. PATENT DOCUMENTS

| | | |
|---|---|---|
| 8,075,377 B2 | 12/2011 | Pope et al. |
| 8,231,446 B2 | 7/2012 | Pope et al. |
| 8,333,640 B2 * | 12/2012 | Bussmann .............. A01F 7/067 460/80 |
| 2008/0058042 A1 * | 3/2008 | Isaac ....................... A01F 7/067 460/119 |
| 2008/0207287 A1 * | 8/2008 | McKee ................... A01F 7/067 460/69 |
| 2008/0207288 A1 * | 8/2008 | Isaac ....................... A01F 7/067 460/111 |
| 2011/0320087 A1 * | 12/2011 | Farley .................... A01F 7/067 701/34.2 |

* cited by examiner

CONICAL ROTOR DISCHARGE HOUSING WITH ADJUSTABLE VANES

FIELD OF THE INVENTION

This invention relates generally n apparatus for transitioning a flow of crop residue in an agricultural combine from an axially arranged threshing or separating system of such combine to a following beater or integrated chopper so as to effect better distribution of the residue across the width of the beater or chopper, and, more particularly, to an apparatus including an adjustable discharge deflector positioned so as to be impinged by the greater flow of crop residue being discharged at one side of an axially extending rotor and concave assembly of the threshing or separating system and to deflect a portion of such flow so as to better distribute the crop residue across the width of the beater or chopper as the crop residue is introduced into the beater or chopper.

BACKGROUND OF THE INVENTION

As described in U.S. Pat. No. 7,731,576 to CNH America LLC, which is incorporated by reference herein in its entirety, axially arranged rotary threshing or separating systems have long been in use in agricultural combines for threshing crops to separate grain from crop residue, also referred to as material other than grain (MOG). Such axially arranged systems typically include at least one cylindrical rotor rotated within a concave or cage, with the rotor and surrounding concave being oriented so as to extend forwardly to rearwardly within the combine.

In operation, crop material is fed or directed into a circumferential passage between the rotor and the concave, hereinafter referred to as a rotor residue passage, and is carried rearwardly along a generally helical path in such passage by the rotation of the rotor as grain is threshed from the crop material. The flow of crop residue or MOG remaining between the rotor and concave after threshing is typically discharged or expelled by the rotating rotor at a rear or downstream end of the rotor and the rotor residue passage in a generally downward, or a downward and sidewardly, direction in what is a continuation of the helical path of movement of the crop residue within the rotor residue passage between the rotor and concave.

The flow is typically discharged into a discharge opening at the downstream end of the rotor and into a further passage, hereinafter referred to as a discharge passage or discharge chute, that extends downwardly and somewhat rearwardly into a crop residue distribution system located below and rearwardly of the rear end of the threshing system, which crop residue distribution system typically includes a laterally disposed rotary beater or chopper that beats or chops the crop residue into smaller pieces and propels the resulting chopped crop residue rearwardly within a rear end of the combine for either discharge from the combine through a rear opening onto a field or introduction into a residue spreader apparatus, which residue spreader apparatus may include a further chopper and/or spreader, mounted on the rear end and operable for spreading the residue over a swath of a field.

Due to the nature of operation of the threshing rotor, the design of such rotor and concave, and the helical movement of the crop residue within the rotor residue passage, the resulting flow of crop residue from the rotor residue passage into the discharge opening is often greater on the downward sweep side of the rotor than on the upward sweep side, as a consequence of which an uneven flow of crop residue is presented across the width of the discharge opening and so introduced into the beater or chopper. Such uneven input flow has typically, in the past, resulted in inefficient operation of the beater or chopper, uneven wear of components of the beater or chopper, and poor material conveyance from the beater or chopper to the residue spreader apparatus at the rear of the harvester.

Since the flow of crop residue as introduced into the beater or chopper is often considerably heavier at one side of the beater or chopper, the crop mat introduced into the beater or chopper is often too thick for the beater or chopper to effectively handle, as a consequence of which the chop quality of the residue discharged from the beater or chopper is often less than desirable. Because the components of the beater or chopper which are associated with the side of the beater or chopper that experiences such heavier flow are subjected to greater abuse, they wear more quickly, thus degrading the performance of the beater or chopper over time, especially on the side handling the heavier flow. As a consequence, the output flow of residue from the beater or chopper often exhibits both uneven chop quality and uneven distribution across the width of the beater or chopper, with the heavier concentration of the poorly chopped residue remaining concentrated along the side of heavier flow from the threshing rotor as the crop residue proceeds toward the residue spreader. Such uneven flow across the width of the beater or chopper poses difficulties for the combine users.

Combine users desire, in many instances, when the crop residue is to be spread in a swath over a field, that the crop residue be distributed evenly or uniformly over the swath. Uniform distribution is desirable for a number of reasons. Included among such reasons are that uneven crop residue distribution on a field can lead to temperature and moisture gradients detrimental to even growth of future crops on the field, uneven distribution can make it difficult for crops to utilize nutrients, and uneven distribution can impact the effectiveness of agricultural chemicals. In addition, the existence of large discontinuities of spread crop residue can lead to plugging and other functional problems when such discontinuities are encountered by tillage and/or planting equipment.

It has been recognized that one factor that affects the ability of a residue spreader to distribute crop residue evenly or uniformly over a field is the transverse or side to side evenness of crop residue inflow into the residue spreader. However, the side to side uniformity of the infeed to the residue spreader is directly related to the side to side uniformity of the output flow from the beater or chopper, and since such output flow is recognized to be a function of the side to side distribution of crop residue infeed into the beater or chopper from the threshing system, it is therefore desirable to be able to effect a relatively uniform distribution of crop residue across the width of the beater or chopper, or at least to be able to more evenly distribute the flow being discharged from the threshing rotor.

In light of the foregoing considerations, several devices and structures have been developed to try to improve and better distribute the flow of crop residue from axially arranged threshing systems into crop residue distribution systems, including constructions such as are disclosed U.S. Pat. No. 7,731,576 (the '576 Patent).

Figure 1:
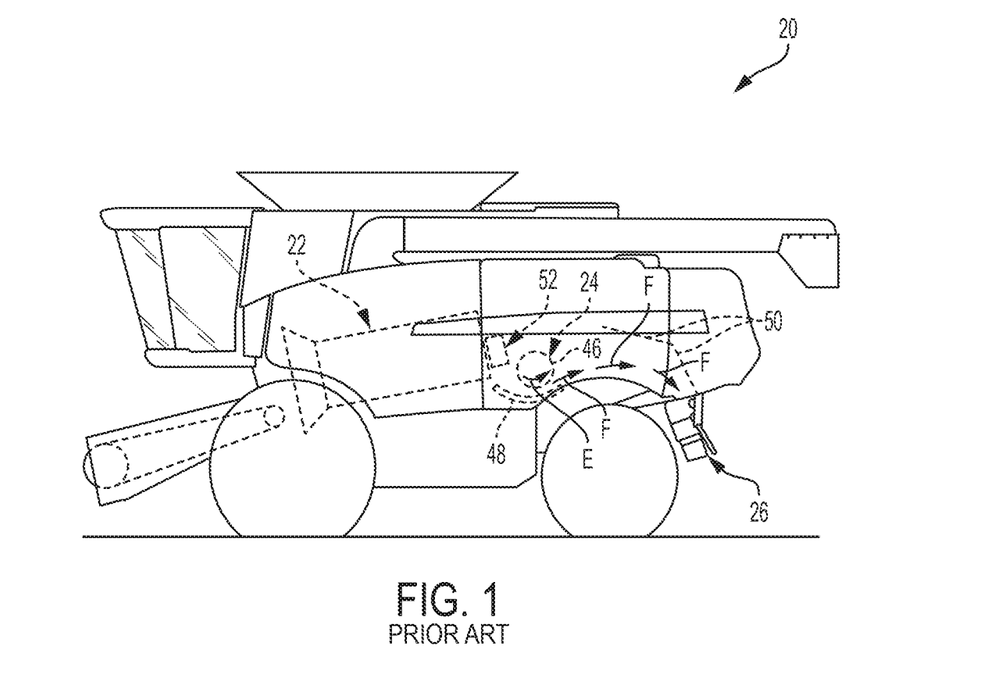
FIG. 1 is a simplified side plan view of an agricultural combine according to the prior art, illustrating in dotted lines an axially arranged threshing system of the combine, and a rigid rotor discharge deflector apparatus for uniformly directing crop residue flow from the threshing system to a beater or chopper of the combine.

FIG. 1 of the '576 Patent, reproduced herein as FIG. 1, depicts a representative agricultural combine 20 that includes an axially arranged threshing system 22 and a crop residue distribution system 24 that includes a beater or chopper 46.

Figure 2:
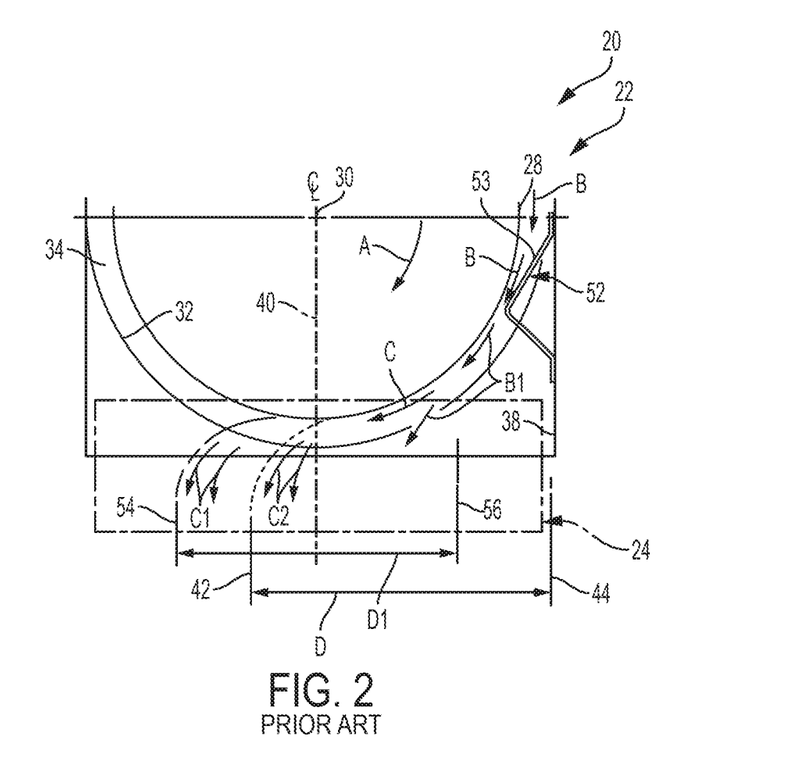
FIG. 2 is a simplified plan view at the rear of the rotor of the combine of FIG. 1 according to the prior art, showing the threshing system and a deflector apparatus, and illustrating in phantom a path of crop residue flow expelled from the threshing system, and an adjusted path of the flow as effected by the deflector apparatus.
Figure 3:
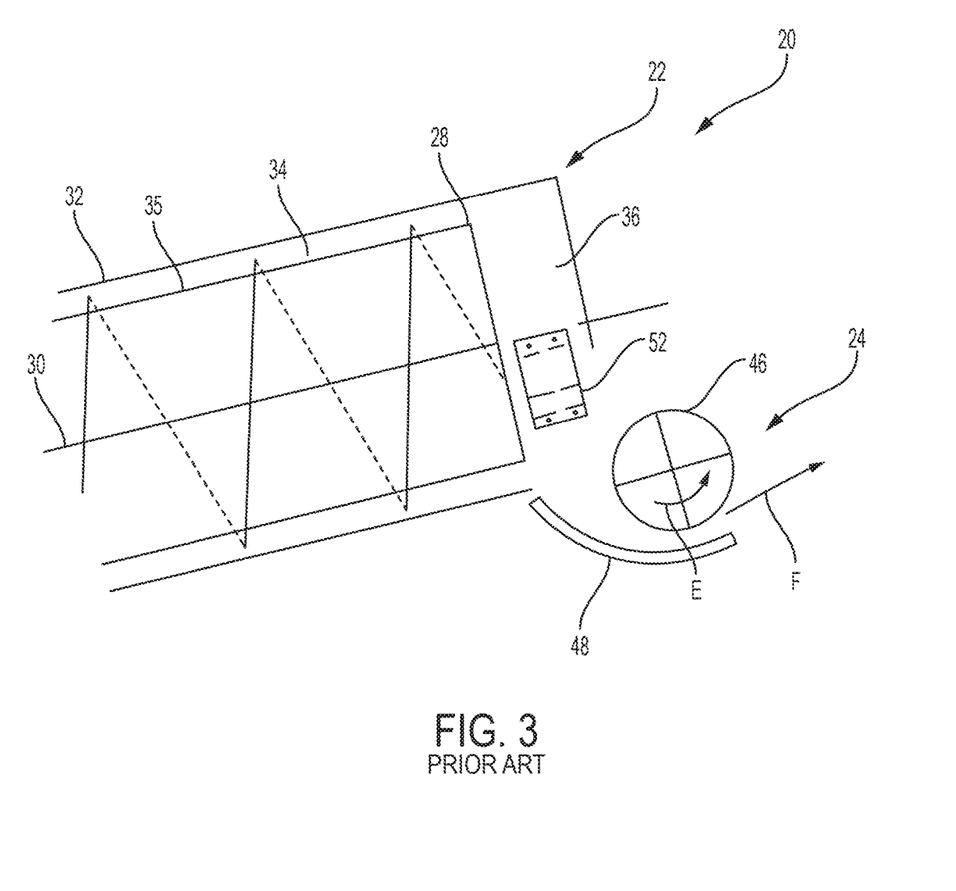
FIG. 3 is a simplified side plan view of the threshing system, deflector apparatus of the invention, and a beater or chopper according to the prior art.

As can be generally and essentially observed from a review and study of FIGS. 1-3 of the '576 Patent, which are reproduced herein as FIGS. 1-3, respectively, threshing system 22 is axially arranged in that it includes a cylindrical rotor 28 conventionally supported and rotatable in a predetermined direction, with arrow A in FIG. 2 denoting a typical clockwise, or forward, rotation, about a rotational axis 30 therethrough and within a concave 32, for conveying a flow of crop material in a helical flow path through a space 34 extending circumferentially around an outer cylindrical surface 35 of rotor 28 and an inner circumferential surface of concave 32. As the crop material is moved through space 34, the crop, such as grain, legumes, or the like, will be loosened and separated from crop residue such as husk and pods, and carried away therefrom in the well-known conventional manner.

As may be observed from FIG. 3, the crop residue will continue along a helical path through space 34, and will be discharged or expelled therefrom into a discharge opening and through a discharge passage 36, which essentially comprises an extension of space 34 at the downstream end of rotor 28. Some of the flow expelled through discharge passage 36 will tend to be directed to flow generally downwardly along internal side 38 (FIG. 2) of the rotor discharge housing, while some portions of the flow will be directed and/or be carried by rotating rotor 28 and momentum, in a transverse direction, denoted by arrow C in FIG. 2, toward an opposite internal side of combine 20, and will eventually flow downwardly toward the beater or chopper 46 of crop residue distribution system 24, such as denoted by arrows C2.

The consistency of the flow of crop residue, volume thereof, and extent or pattern thereof, will typically vary, and be a function of a variety of conditions, including, but not limited to, a speed of rotation in direction A of rotor 28, crop type, plant maturity, moisture content, and weather conditions. As an example, rotor speeds can vary between just a few hundred rpm and over a thousand rpm. Wheat and other small grains will typically have relatively small crop residue components, whereas other grains, such as corn, will typically have larger components, such as thick stalk segments, cob fragments, and large leaves. Typically, as observable in FIG. 2, the downward flow of crop residue will be more to a right hand side of a front-to-rear extending vertical centerline 40 of both threshing system 22 and crop residue distribution system 24. The sideward extent of such typical downward flow is represented by extent D in FIG. 2, and is generally bounded on the left hand side by a line 42 extending generally downwardly on the left of centerline 40, and on the right hand side by a line 44 extending generally downwardly from internal side 38, the sideward or transverse location of line 42 and thus the transverse extent D of the downward flow varying as a function of one or more of the above conditions and/or parameters.

Here, it should be noted that crop residue distribution system 24 will typically include a rotary device, such as a beater or chopper 46 (see FIG. 3), rotatable in a direction E above a concave pan 48. Chopper 46 typically rotates at a rapid speed, so as to be capable of accelerating and propelling a flow of crop residue rearwardly within the confines of the rear end of combine 20, as generally denoted by arrows F. Such rearward flow is typically guided and directed by internal panels or shields, generally denoted by shields 50 (FIG. 1), so as to either flow into a crop residue chopper and/or spreader, such as chopper/spreader 26, hereinafter referred to as a spreader, or through a rear opening so as to be deposited directly onto a field.

Threshing system 22 includes a rigid rotor discharge deflector apparatus 52 for deflecting crop residue more uniformly across the width of beater or chopper 46. Rigid rotor discharge deflector apparatus 52 includes rigidly braced upper ramp portion 53 that extends into the path of at least a portion of the crop residue flow B. More particularly, upper ramp portion 53 extends into the crop residue flow so that at least portions of that crop residue flow which would flow along or close to side 38, will instead impinge or strike upper ramp portion 53 and be deflected downwardly thereby, as denoted by arrows B and B1 in FIG. 2.

The downwardly directed crop residue flow, as illustrated by representative arrow B1, will be transversely shifted or moved in a transverse direction in the discharge passage, that is, more to the left of internal side 38 in such figures, depending on the transverse position and the slope of upper ramp portion 53.

Addressing FIG. 2 more particularly, the transverse movement or shifting of downwardly directed flow B1 causes a corresponding transverse shift of other portions of the downwardly directed flow in the transverse direction, as illustrated by arrows C1. As described in the '576 Patent, it was found that the overall transverse extent of the downward flow of crop residue, denoted by extent D1, extending between lines 54 and 56, could be transversely moved or shifted by use of a deflector apparatus, such as the rigid rotor discharge deflector 52 and its braced upper ramp portion 53, in the path of portions of flow B in the vicinity of internal side 38 of the combine.

Thus, for a combine including a crop residue distribution system, such as system 24 including a rotary chopper 46, the transverse position or location of crop residue inflow could be adjusted, for example, to be more uniformly distributed with a vertical centerline of the distribution system, such as centerline 40, which is a joint centerline of rotor 28 of threshing system 22 and chopper 46 of distribution system 24, as illustrated by the location of the center of transverse extent D1 in FIG. 2.

As viewed in FIGS. 2 and 3, in its normal, forward operation, rotor 28 is rotated in a clockwise direction, making the right side of concave 32 the downward swept side and the left hand side of concave 32 the upward swept side. Discharge deflector apparatus 52, with its upper ramp portion 53, is shown mounted within the discharge passage 36 at the downstream end of rotor 28 at approximately the level of the axis 30 of rotor 28 at its downstream end, with upper ramp portion 53 extending into the flow of crop residue to intercept at least a portion of the crop residue as the crop residue is helically expelled from the upper portion of rotor residue passage 34 on the downward swept side of rotor 28 and to deflect the intercepted flow so that crop residue will be more uniformly introduced to chopper 46.

Opportunities remain for improving the performance of the above-described threshing system 22. For instance, since discharge deflector 52 is fixed in position, the trajectory of the discharge cannot be adjusted to conform to variable crop conditions, thereby leading to non-uniform material delivery across the width of the chopper 46 in certain conditions. It was also found that deflector 52 recompressed the crop residue or MOG causing the compressed MOG to travel further around the rotor 28 than expected, thereby leading to non-uniform material delivery across the length of the chopper 46. Recompression of the MOG also requires the application of more power to the rotor 28, which is disadvantageous from a power efficiency perspective. Lastly, deflector 52 could be damaged if not retracted before operating rotor 28 in a reverse rotational direction because MOG travelling in an opposite direction could deform the fixed deflector 52.

SUMMARY OF THE INVENTION

The drawbacks of conventional rotor discharge housings are addressed in many aspects by rotor discharge housings in accordance with the invention.

According to one embodiment of the invention, a threshing system for an agricultural harvester comprises a rotor including an elongated body having a longitudinal axis, the elongated body having a proximal end adapted to receive material from a feeding mechanism and a distal end opposite the proximal end. A cage surrounds at least a portion of the proximal end of the rotor. The cage comprises an inner surface spaced radially apart from the rotor to define a threshing space between the rotor and the cage. A discharge housing surrounds at least a portion of the distal end of the rotor. The discharge housing comprises a side wall spaced radially apart from the rotor to define a discharge passage between the rotor and the discharge housing. At least one adjustable vane is mounted to the side wall of the discharge housing on a downswept side of the rotor extending from the inner surface of the discharge housing. The position of the vane is adjustable to change a trajectory of material expelled from the discharge passage and out of the threshing system.

In another embodiment, a threshing system for an agricultural harvester comprises a rotor comprising an elongated body having a longitudinal axis. The elongated body has a proximal end adapted to receive material from a feeding mechanism and a distal end opposite the proximal end. A discharge housing surrounds at least a portion of the distal end of the rotor, and the discharge housing comprises a side wall spaced radially apart from the rotor to define a discharge passage between the rotor and the discharge housing. At least one adjustable vane is mounted to the side wall of the discharge housing on a downswept side of the rotor extending from the inner surface of the discharge housing. The position of the vane is adjustable to change a trajectory of material expelled from the discharge passage. The at least one vane is positioned on a surface of the side wall of the discharge housing that extends away from the longitudinal axis in the distal direction in order to permit expansion (and limit recompression) of the material as the material passes along the at least one vane.

BRIEF DESCRIPTION OF THE DRAWINGS

For the purpose of illustration, there are shown in the drawings certain embodiments of the present invention. It should be understood, however, that the invention is not limited to the precise components, arrangements, dimensions, and instruments shown Like numerals indicate like elements throughout the drawings. In the drawings.

DETAILED DESCRIPTION OF THE INVENTION

Various terms are used throughout the disclosure to describe the physical shape or arrangement of features. A number of these terms are used to describe features on rotors and cages that either have, or conform to, a cylindrical or generally cylindrical geometry characterized by a radius and a center axis perpendicular to the radius. Unless a different meaning is specified, the terms are given the following meanings. The terms "longitudinal", "axial" and "axially" refer to a direction, dimension or orientation that is parallel to the center axis of the rotor. The terms "radial" and "radially" refer to a direction, dimension or orientation that is perpendicular to the center axis of the rotor. The terms "inward" and "inwardly" refer to a direction, dimension or orientation that extends in a radial direction toward the center axis. The terms "outward" and "outwardly" refer to a direction, dimension or orientation that extends in a radial direction away from the center axis.

Referring now to the embodiment of the invention shown in FIGS. 4-7, disclosed herein is a threshing system 122 that is similar to threshing system 22 described above. Only the primary differences between those systems will be described hereinafter.

Figure 4:
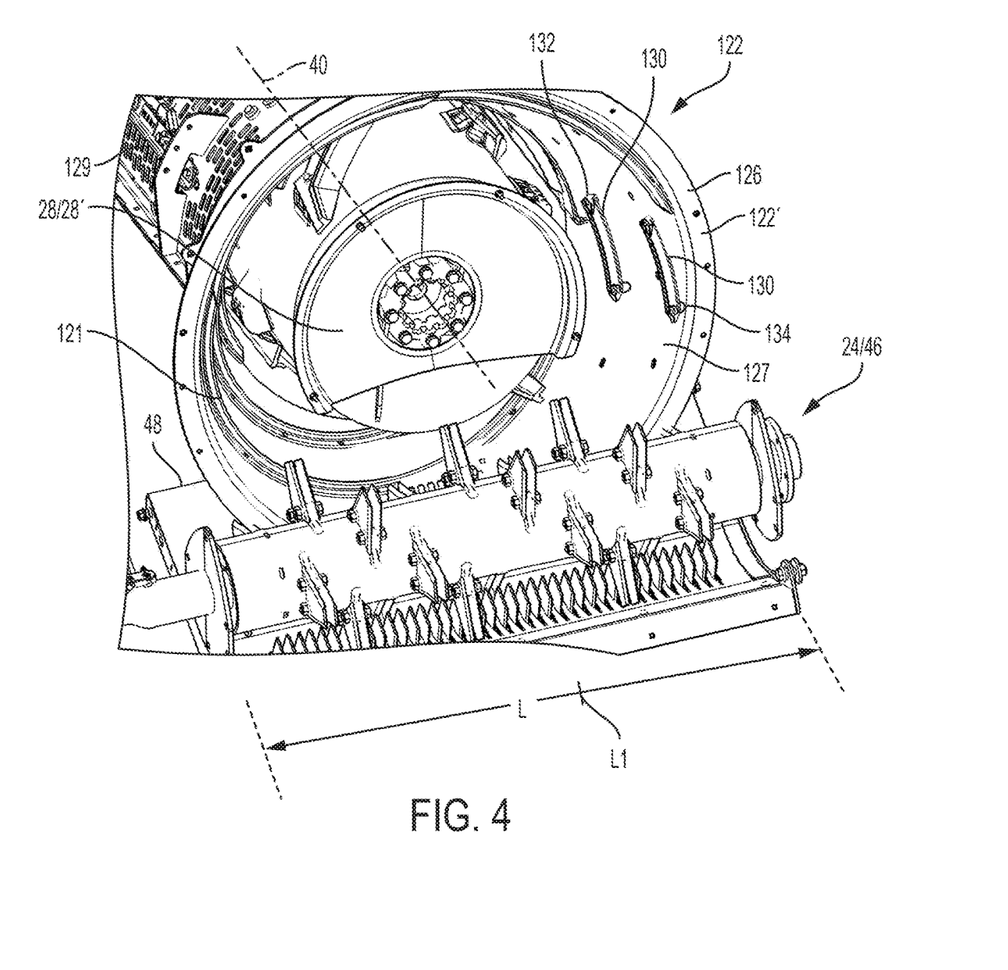
FIG. 4 is an isometric view of a threshing system and a crop residue distribution system of a combine, according to one embodiment of the invention, the isometric view taken from the discharge side of the combine, the threshing system including moveable vanes shown in a first position.

The threshing system 122 includes a rotor 28 comprising an elongated body having a longitudinal axis 40. The elongated body of rotor 28 has a proximal end adapted to receive material from a feeding mechanism and a distal end 28' opposite the proximal end. A cage or concave 129 surrounds at least a portion of the proximal end and intermediate portion of rotor 28. A threshing space is defined between rotor 28 and concave 129. A discharge housing 126 surrounds the distal end 28' of rotor 28, and a discharge passage 127 is defined between rotor 28 and discharge housing 126.

Referring now to the features of discharge housing 126, discharge housing 126 is axially positioned at a location that is distal of concave 129 and proximal to chopper 46. Discharge housing 126 is fixed in position relative to chopper 46 and rotor 28. Unlike the discharge housing of FIG. 2 having parallel side walls 38, discharge housing 126 of FIG. 4 has a frusto-conical shape, with the larger diameter portion of discharge housing 126 positioned adjacent distal end 28' of rotor 28. Discharge housing 126 defines a discharge end 122' at its distal end through which the MOG is expelled.

Although not shown, housing 126 may have perforations to allow free grain to pass, similar to concave 129.

Discharge end 122' of housing 126 may be cylindrical for connecting to another structure. Also, although not shown, a reverse cone may be mounted to end 122' to prevent crop from wrapping around the threshing rotor drive shaft. Also, although not shown, a reversing discharge vane may be incorporated into threshing system 122.

Figure 8A:
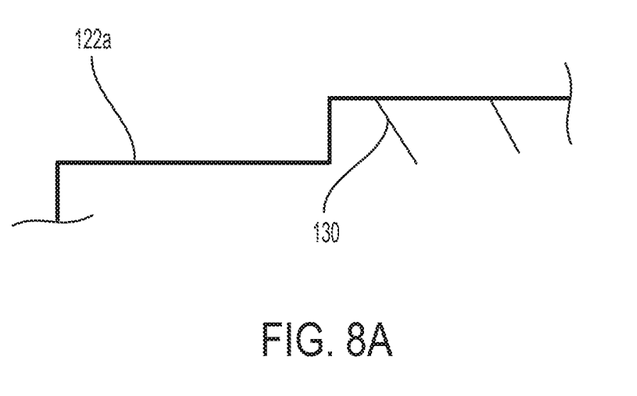
FIGS. 8A and 8B are schematic views of alternative discharge housings.
Figure 8B:
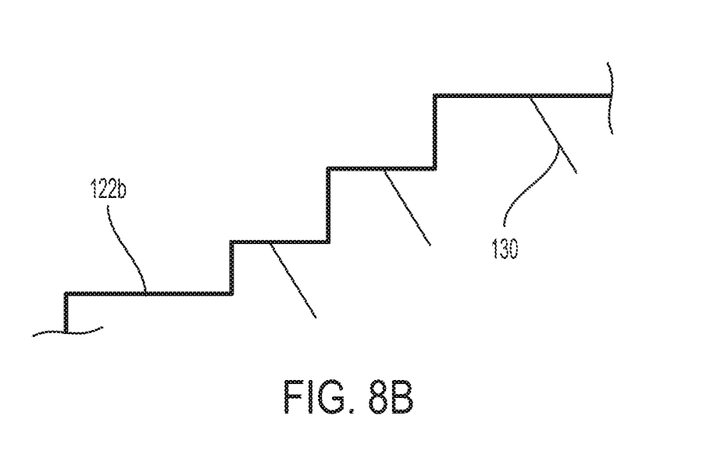

Discharge housing 126 may be frusto-conical, as shown, or may take another shape. For example, as shown in FIG. 8A, discharge housing 126a may be cylindrical. As shown in FIG. 8B, discharge housing 126b may also be in the form of a stepped cylinder, i.e., a cylindrical body having increasing diameters at each step. Regardless of the shape of the discharge housing, the diameter of discharge housing 126 generally increases in the distal direction, i.e., in the direction toward discharge end 122'.

Referring back to FIGS. 4-7, a series of fixed helical vanes 121 are positioned on the upward swept side of the interior facing surface of housing 126 for guiding the passage of MOG toward end 122' of housing 126. Helical vanes 121 are fixed in position and are prevented from movement with respect to housing 126, which is also fixed in position.

Figure 9A:
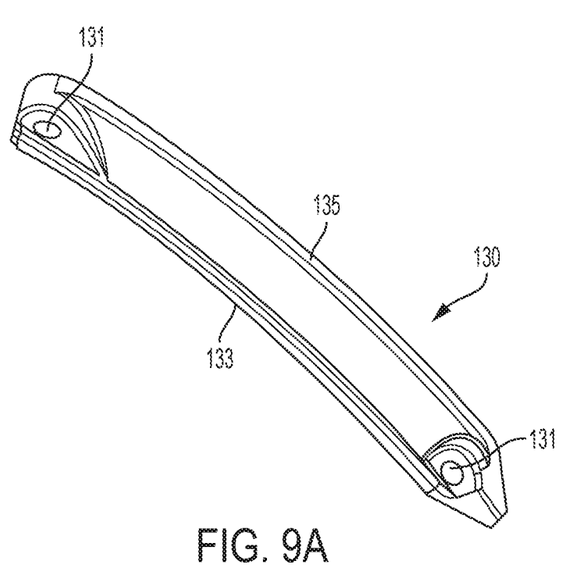
FIGS. 9A and 9B are isometric views of the vane of the threshing system of FIGS. 4-7.
Figure 9B:
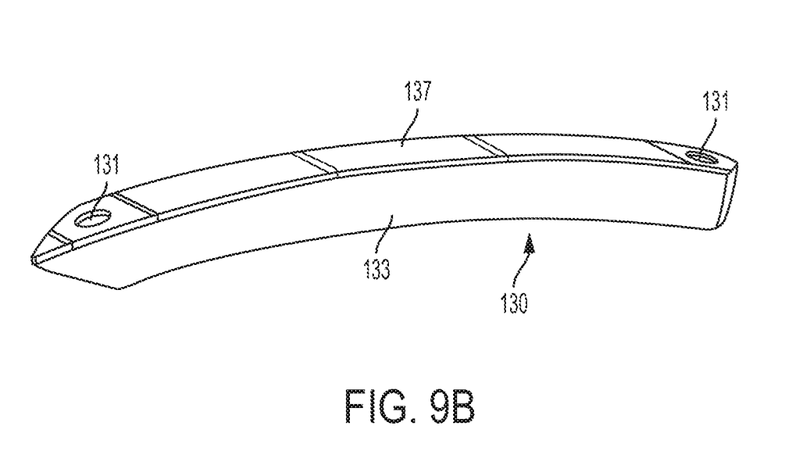

Two movable vanes 130 are positioned on the downward swept side of the side wall of the housing 126. Although only one vane 130 will be described hereinafter, it should be understood that the following explanation applies to each vane 130. FIGS. 9A and 9B are isometric views of the vane 130.

As best shown in FIGS. 9A and 9B, vane 130 comprises an elongated body. Two holes 131 are defined at the ends of the elongated body. Each hole 131 is sized to receive a fastener (such as a bolt and a bushing, or a pin) that enables pivoting motion of vane 130, which will be described in greater detail later. The elongated body include a leading edge 133 and a trailing edge 135. Leading edge 133 extends further, in a transverse direction, from the elongated body than trailing edge 135. Leading edge 133 is curved so as to guide the MOG passing thereby along a helical trajectory. The lower surface 137 of vane 130 is also curved so that that it conforms to the inner circumference of the inwardly facing side wall of housing 126. The length of the vanes 130 may differ.

Like deflector 52 of FIG. 2, vane 130 is positioned on the right hand side of the front-to-rear extending vertical centerline 40 of both threshing system 122 and crop residue distribution system 24. The right hand side of vertical centerline 40 is viewed from discharge end 122' of threshing system 122. Stated differently, vane 130 is positioned on the downward swept side of rotor 28 .

Vane 130 is positioned in the discharge passage 127 of housing 126 and at an axial position adjacent distal end 28' of rotor 28. Moreover, vane 130 is positioned at an axial position that is distal to concave(s) 129 and proximal to chopper 46.

Vane 130 extends transversely from the inwardly facing side wall of housing 126 toward the longitudinal axis of rotor 28 (i.e., centerline 40). Vane 130 also extends partially about the inner circumference of the inwardly facing side wall of housing 126 along a helical path with respect to centerline 40.

Because vane 130 is positioned in the larger diameter end of housing 126 and extends orthogonally from the inner facing surface of housing 126 by a minimal distance, vane 130 guides the MOG rather than recompresses the MOG. This results in a power savings as compared with deflector 52 of the '576 Patent. In other words, less energy is required to rotate rotor 28 of FIGS. 4-7 as compared with that of the '576 Patent.

Figure 5:
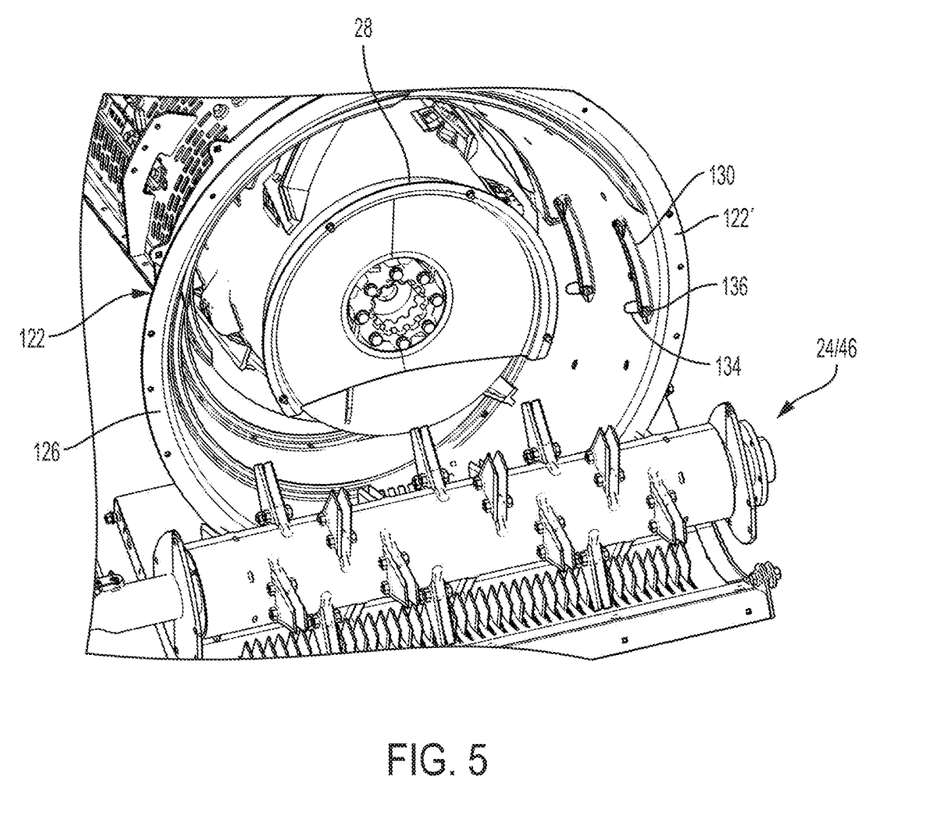
FIG. 5 shows the moveable vanes of FIG. 4 pivoted to a second position.
Figure 6:
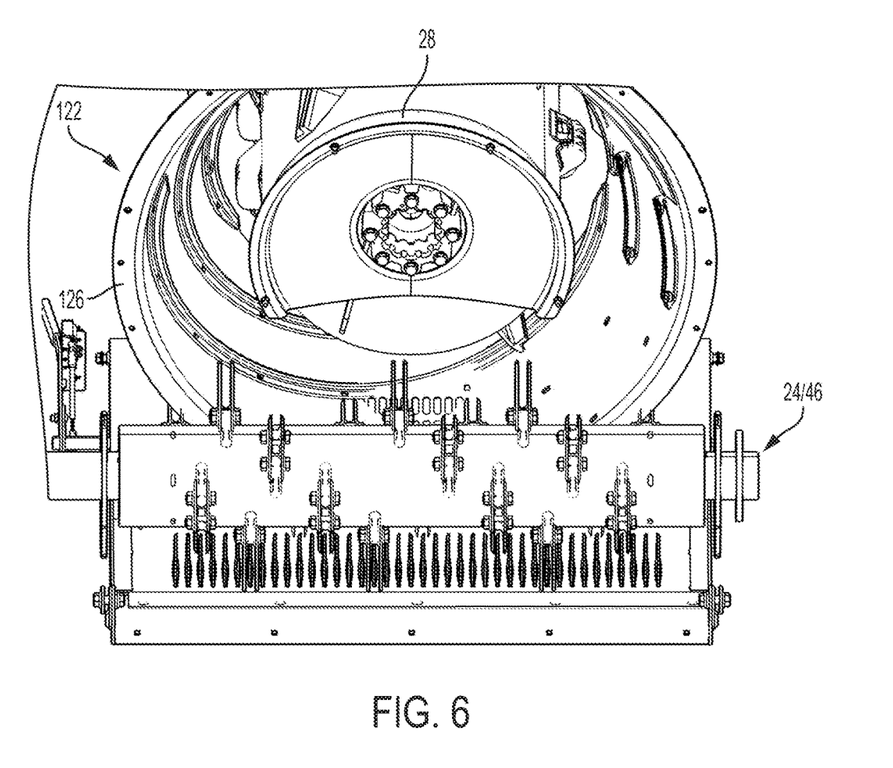
FIG. 6 is a rear elevation view of the threshing system and the crop residue distribution system of FIG. 4.

Vane 130 is capable of pivoting between the positions shown in FIGS. 4 and 5. The top end of vane 130 is rotatably coupled to housing 126 by fastener 132 (which may be a bolt and a bushing, or a pin, for example). Vane 130 pivots about fastener 132. A second fastener 136 is mounted to the bottom end of vane 130, and second fastener 136 is positioned within an elongated slot 134 formed through the side wall of housing 126. Second fastener 136 is capable of translating along the elongated slot 134, along with the bottom end of vane 130 as the bottom end of vane 130 pivots either toward or away from end 122' in operation.

Although two vanes 130 are shown herein, it should be understood that the number of vanes 130 may vary (e.g., one, two, three, four, etc.). Vanes 130 are axially spaced apart from each other and radially aligned with each other.

Figure 7:
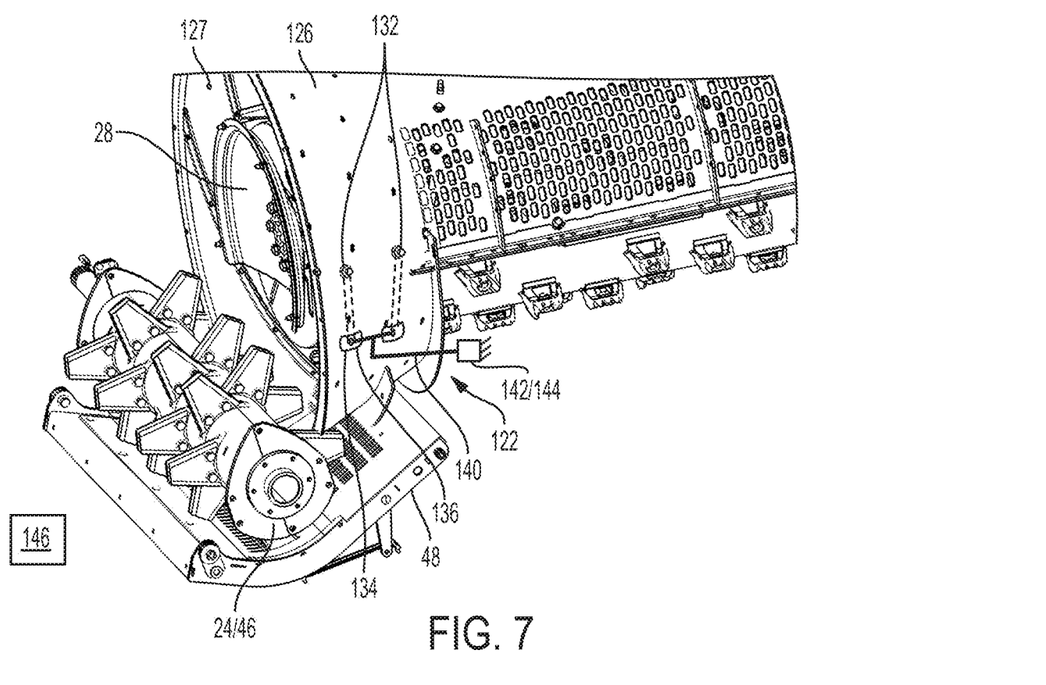
FIG. 7 is an isometric view of the threshing system and the crop residue distribution system of FIG. 4 taken from the right side and the discharge side of the combine.

As best shown in FIG. 7, a linkage 140 is provided for pivoting both vanes 130 simultaneously. Linkage 140 comprises a first rod that is connected (either directly or indirectly) to both fasteners 136. A second rod connects the first rod to an actuator 142. Actuator 142, which is shown schematically, moves linkage 140 to cause vanes 130 to move between the positions shown in FIGS. 4 and 5. Actuator 142 may be hydraulic, electric or pneumatic, for example. Actuator 142 may be mounted to any fixed location of the combine.

Vanes 130 are adjusted simultaneously by actuator 142 and linkage 140, as described above, however, vanes 130 may be individually adjusted, or, vanes 130 may be adjusted at different rates by a linkage (not shown) having either (i) a mechanical advantage to the original connecting link, or (ii) a varied distance from the pivot point for a respective vane to the link attachment point.

Alternatively, linkage 140 may be operated manually in lieu of actuator 142.

Referring still to FIG. 7, the position of each vane 130 may be automatically controlled by a feedback system comprising a controller 144 that activates actuator 142 based upon readings or measurements detected by a sensor 146 (shown schematically). The sensor could, for example, monitor the MOG load in the trailed equipment, determine the distribution of MOG expelled from the left hand and right hand sides of the combine, or measure the MOG load between various competing components, such as two hydraulic motors on a straw spreader mill (not shown).

In operation, the crop is delivered in a helical fashion through threshing system 122 and the resulting grain separates from the crop. Housing 126 allows the crop residue to expand and release any remaining free grain as the grain spirals rearward. The residual crop residue or MOG passes along vanes 130, and the MOG is ultimately delivered onto chopper 46. Vanes 130 are angled so that the MOG is expelled from threshing system 122 preferably over the entire length 'L' or at the midpoint L1 of chopper 46.

Variable conditions, such as the rotation speed of rotor 28, crop type, plant maturity, moisture content, and weather conditions, and so forth, can affect the trajectory of the MOG expelled from threshing system 122, and, for that reason, threshing system 122 is uniquely configured such that the angle of each vane 130 is changed to compensate for the above-identified variable conditions. More particularly, sensor 146 detects if MOG is expelled unevenly (and, therefore, over less than the entire length 'L' of chopper 46), and communicates the same to controller 144. Controller 144 then activates actuator 142, which pivots vanes 130 along their respective slots 134 by way of linkage 140 causing MOG to be expelled uniformly over the entire length 'L' of chopper 46.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A threshing system for an agricultural harvester, the threshing system comprising:
   a rotor comprising an elongated body having a longitudinal axis, the elongated body having a proximal end adapted to receive material from a feeding mechanism and a distal end opposite the proximal end;
   a cage that surrounds at least a portion of the proximal end of the rotor, the cage comprising an inner surface spaced radially apart from the rotor to define a threshing space between the rotor and the cage;
   a discharge housing that surrounds at least a portion of the distal end of the rotor, the discharge housing comprising a side wall spaced radially apart from the rotor to define a discharge passage between the rotor and the discharge housing; and
   a plurality of adjustable vanes mounted to the side wall of the discharge housing at a downswept side of the rotor, each adjustable vane extending radially from the inner surface of the discharge housing and into the discharge passage, each vane being movable relative to an adjacent portion of the discharge housing between a first position in which the vane is at a first helical angle relative to the longitudinal axis and a second position in which the vane is at a second helical angle relative to the longitudinal axis to thereby change a trajectory of the material expelled from the discharge passage and out of the threshing system,
   wherein the vanes are axially spaced apart from each other such that a space is formed between the vanes along which material can pass.

2. The threshing system of claim 1, wherein a diameter of the discharge housing increases in a distal direction, and one of the vanes is positioned at or near a large diameter distal end of the discharge housing in order to permit expansion and limit compression of the material as the material passes through the discharge housing and along said one of the vanes.

3. The threshing system of claim 1, wherein each vane is axially spaced from the cage.

4. The threshing system of claim 1, wherein the plurality of vanes are positioned adjacent one another at the downward swept side of the rotor, and are radially aligned with one another.

5. The threshing system of claim 1, further comprising an actuator for pivoting at least one of the vanes.

6. The threshing system of claim 5, wherein the actuator is configured to simultaneously pivot the plurality of vanes.

7. The threshing system of claim 5, further comprising a feedback system comprising the actuator, a sensor and a controller, wherein the sensor senses, either directly or indirectly, the trajectory of material expelled from the discharge passage, and communicates the sensed trajectory to the controller and the controller activates the actuator to pivot at least one of the vanes and thereby adjust the trajectory of material expelled from the discharge passage.

8. The threshing system of claim 1, wherein each vane is positioned on a frustoconical portion of the side wall of the discharge housing.

9. The threshing system of claim 1, wherein an inner diameter of the inner surface of the discharge housing increases in a distal direction toward the distal end of the rotor.

10. The threshing system of claim 1, further comprising a slot formed in the side wall of the discharge housing for accommodating movement of at least one of the adjustable vanes.

11. The threshing system of claim 1, further comprising a fixed vane mounted to the side wall of the discharge housing and positioned at an upward swept side of the rotor.

12. A threshing system for an agricultural harvester, the threshing system comprising:
   a rotor comprising an elongated body having a longitudinal axis, the elongated body having a proximal end adapted to receive material from a feeding mechanism and a distal end opposite the proximal end;
   a discharge housing that surrounds at least a portion of the distal end of the rotor, the discharge housing comprising a curved side wall spaced radially apart from the rotor to define a discharge passage between the rotor and the discharge housing; and
   at least one adjustable vane mounted to the side wall of the discharge housing at a downswept side of the rotor, the at least one adjustable vane extending radially from the inner surface of the discharge housing toward the longitudinal axis, the least one adjustable vane being movable relative to an adjacent portion of the discharge housing between a first position in which the least one adjustable vane is at a first helical angle relative to the longitudinal axis and a second position in which the vane is at a second helical angle relative to the longitudinal axis to thereby change a trajectory of material expelled from the discharge passage and out of the threshing system,
   wherein the least one adjustable vane has a curved mating surface slidably abutting the curved side wall of the discharge housing.

13. The threshing system of claim 12, further comprising a plurality of vanes mounted to the side wall of the discharge housing.

14. The threshing system of claim 12, wherein the side wall is frustoconical, stepped or cylindrical.

15. The threshing system of claim 12, further comprising an actuator for pivoting the at least one adjustable vane.

16. The threshing system of claim 15, further comprising a feedback system comprising the actuator, a sensor and a controller, wherein the sensor senses, either directly or indirectly, the trajectory of material expelled from the discharge passage, and communicates the sensed trajectory to the controller and the controller activates the actuator to pivot the at least one adjustable vane and thereby adjust the trajectory of material expelled from the discharge passage.

17. The threshing system of claim 12, wherein a radial distance between the at least one adjustable vane and the longitudinal axis is greater than a radial distance between the inner surface of the cage and the longitudinal axis.

18. The threshing system of claim 12, further comprising a slot formed in the side wall of the discharge housing for accommodating movement of the at least one adjustable vane.

19. The threshing system of claim 12, wherein the at least one adjustable vane has a helical shape.

20. The threshing system of claim 1, wherein each vane has a curved mating surface slidably abutting a curved side wall of the discharge housing.

21. The threshing system of claim 1, wherein each vane is pivotally mounted to the discharge housing by a first fastener, and slidably mounted to the discharge housing by a second fastener.

* * * * *